(12) United States Patent
Li et al.

(10) Patent No.: US 9,517,458 B2
(45) Date of Patent: Dec. 13, 2016

(54) STABILIZED MICROPOROUS CRYSTALLINE MATERIAL, THE METHOD OF MAKING THE SAME, AND THE USE FOR SELECTIVE CATALYTIC REDUCTION OF $NO_x$

(71) Applicant: PQ CORPORATION, Valley Forge, PA (US)

(72) Inventors: Hong-Xin Li, Lansdale, PA (US); Bjorn Moden, Glen Mills, PA (US); William E. Cormier, Harleysville, PA (US)

(73) Assignee: PQ Corporation, Valley Forge, PA (US)

( * ) Notice: Subject to any disclaimer, the term of this patent is extended or adjusted under 35 U.S.C. 154(b) by 847 days.

(21) Appl. No.: 13/691,727

(22) Filed: Nov. 30, 2012

(65) Prior Publication Data

US 2013/0142727 A1    Jun. 6, 2013

Related U.S. Application Data

(60) Provisional application No. 61/566,106, filed on Dec. 2, 2011.

(51) Int. Cl.

| | | |
|---|---|---|
| *B01J 29/06* | (2006.01) | |
| *B01D 53/56* | (2006.01) | |
| *C01B 39/02* | (2006.01) | |
| *B01J 29/88* | (2006.01) | |
| *B01D 53/94* | (2006.01) | |
| *B01J 29/072* | (2006.01) | |
| *B01J 29/83* | (2006.01) | |
| *C01B 37/08* | (2006.01) | |
| *C01B 39/54* | (2006.01) | |
| *B01J 29/76* | (2006.01) | |
| *B01J 29/85* | (2006.01) | |
| *B01J 35/02* | (2006.01) | |
| *B01J 29/70* | (2006.01) | |
| *B01J 29/035* | (2006.01) | |
| *B01D 53/58* | (2006.01) | |
| *C01B 39/46* | (2006.01) | |

(52) U.S. Cl.
CPC ............ *B01J 29/88* (2013.01); *B01D 53/9418* (2013.01); *B01J 29/0356* (2013.01); *B01J 29/072* (2013.01); *B01J 29/7065* (2013.01); *B01J 29/763* (2013.01); *B01J 29/83* (2013.01); *B01J 29/85* (2013.01); *B01J 35/023* (2013.01); *C01B 37/08* (2013.01); *C01B 39/02* (2013.01); *C01B 39/026* (2013.01); *C01B 39/54* (2013.01); *B01D 53/58* (2013.01); *B01D 2251/208* (2013.01); *B01D 2251/2062* (2013.01); *B01D 2251/2067* (2013.01); *B01D 2253/1085* (2013.01); *B01D 2255/202* (2013.01); *B01D 2255/204* (2013.01); *B01D 2255/2022* (2013.01); *B01D 2255/2042* (2013.01); *B01D 2255/2045* (2013.01); *B01D 2255/2047* (2013.01); *B01D 2255/2063* (2013.01); *B01D 2255/2065* (2013.01); *B01D 2255/2066* (2013.01); *B01D 2255/2068* (2013.01); *B01D 2255/20738* (2013.01); *B01D 2255/20761* (2013.01); *B01D 2255/50* (2013.01); *B01D 2255/9205* (2013.01); *B01D 2255/9207* (2013.01); *B01J 2229/183* (2013.01); *B01J 2229/186* (2013.01); *B01J 2229/36* (2013.01); *C01B 39/46* (2013.01)

(58) Field of Classification Search
USPC ... 502/60, 73, 74; 423/700, 709, 713, 213.2, 423/213.5
See application file for complete search history.

(56) References Cited

FOREIGN PATENT DOCUMENTS

| | | |
|---|---|---|
| CN | 101674885 A | 3/2010 |
| CN | 101730575 A | 6/2010 |
| CN | 101983103 A | 3/2011 |
| CN | 102029175 A | 4/2011 |
| CN | 102215960 A | 10/2011 |
| EP | 0391351 A2 | 10/1990 |
| WO | WO2010/054034 A2 | 5/2010 |
| WO | WO2011/146615 A2 | 11/2011 |
| WO | WO2012/145323 A1 | 10/2012 |

OTHER PUBLICATIONS

International Preliminary Report on Patentability from the European Patent Office for International Application No. PCT/U82012/067485 mailed Jun. 12, 2014.

(Continued)

*Primary Examiner* — Elizabeth Wood
(74) *Attorney, Agent, or Firm* — Finnegan, Henderson, Farabow, Garrett & Dunner, LLP

(57) ABSTRACT

There is disclosed a microporous crystalline material having pore opening ranging from 3 to 5 Angstroms, where the material comprises a first metal chosen from alkali earth group, rare earth group, alkali group, or mixtures thereof, and a second metal chosen from iron, copper or mixtures thereof; and has a molar silica to alumina ratio (SAR) from 3 to 10. The microporous crystalline material disclosed herein may comprise a crystal structure having building units of double-6-rings (d6r) and pore opening of 8-rings as exemplified with framework types defined by the Structure Commission of the International Zeolite Association having structural codes of CHA, LEV, AEI, AFT, AFX, EAB, ERI, KFI, SAT, TSC, and SAV. There is also disclosed a method of selective catalytic reduction of nitrogen oxides in exhaust gas, comprising at least partially contacting the exhaust gases with an article comprising the disclosed microporous crystalline material.

35 Claims, 3 Drawing Sheets

(56) References Cited

OTHER PUBLICATIONS

International Search Report and Written Opinion of the International Searching Authority in related PCT Application No. PCT/US2012/067485, dated Apr. 11, 2013.
Hasegawa Y, Abe C, Nishioka M, Sato K, Nagase T, Hanaoka T, "Influence of synthesis gel composition on morphology, composition, and dehydration performance of CHA-type zeolite membranes," Journal of Membrane Science, (Jul. 30, 2010), vol. 363, p. 256-64.
Notification of First Office Action from the State Intellectual Property Office of the People's Republic of China dated May 5, 2015 (19 pages total).

STABILIZED MICROPOROUS CRYSTALLINE MATERIAL, THE METHOD OF MAKING THE SAME, AND THE USE FOR SELECTIVE CATALYTIC REDUCTION OF $NO_x$

This application claims priority to U.S. Provisional Application No. 61/566,106, filed on Dec. 2, 2011, which is incorporated herein by reference in its entirety.

The present disclosure generally provides a microporous crystalline material having pore opening ranging from 3 to 5 Angstroms, where the material comprises a first metal chosen from alkali-earth group, rare-earth group, alkali group, or mixtures thereof, and a second metal chosen from iron and/or copper. The present disclosure also relates to methods of making and using such microporous crystalline material, including for selective catalytic reduction (SCR) of nitrogen oxides (NOx) in exhaust gases.

Nitric oxides ($NO_x$) have long been known to be polluting gases, principally by reason of their corrosive action. In fact, they are the primary reason for the cause of acid rain. A major contributor of pollution by NOx is their emission in the exhaust gases of diesel automobiles and stationary sources such as coal-fired power plants and turbines. To avoid these harmful emissions, SCR is employed and involves the use of zeolitic catalysts in converting NOx to nitrogen and water.

Thus, there is a continuing need for improved microporous crystalline material that has enhanced performance and hydrothermal stability properties to allow for the selective catalytic reduction of $NO_x$ in exhaust gases.

SUMMARY

To address this need, the Inventors have discovered a material that comprises a first metal chosen from alkali earth group, rare-earth group, alkali group or mixtures thereof, and a second metal chosen from iron, copper or mixtures thereof; has pore opening ranging from 3 to 5 Angstroms; and has a molar silica to alumina ratio (SAR) from 3 to 10. In one embodiment, the material is synthesized by a process free of organic structure directing agent (OSDA). In one embodiment, the material comprises CHA structure as defined by the Structure Commission of the International Zeolite Association. In one embodiment, the material may comprise a crystal structure having building units of double-6-rings (d6r) and pore opening of 8-rings as exemplified with framework types defined by the Structure Commission of the International Zeolite Association having structural codes of LEV, AEI, AFT, AFX, EAB, ERI, KFI, SAT, TSC, and SAV.

The material described herein exhibits excellent hydrothermal stability properties. For example, the disclosed material typically retains at least 70% of its surface area and micropore volume after exposure to temperatures of 700-900° C. in the presence of up to 10 volume percent water vapor for 1-16 hours.

There is also disclosed a method of selective catalytic reduction of nitrogen oxides in exhaust gas using the disclosed microcrystalline material. In one embodiment, the method comprises:
at least partially contacting the exhaust gases with an article comprising a microporous crystalline material having pore opening ranging from 3-5 Angstroms, where the material comprises a first metal chosen from alkali earth group, rare-earth group, alkali group or mixtures thereof and a second metal chosen from iron, copper or mixtures thereof.

It is appreciated that the material described herein may be used in article, such as one in the form of a channeled or honeycombed-shaped body; a packed bed, such as balls, pebbles, pellets, tablets, extrudates, other particles, or combinations thereof; microspheres; or structural pieces, such as in the form of plates or tubes.

As one skilled in the art would appreciate, the channeled or honeycombed-shaped body or structural piece is formed by wash-coating said crystalline material onto a preformed honeycombed-shaped body or by extruding a mixture comprising the said crystalline material.

Aside from the subject matter discussed above, the present disclosure includes a number of other exemplary features such as those explained hereinafter. It is to be understood that both the foregoing description and the following description are exemplary only.

BRIEF DESCRIPTION OF THE DRAWINGS

The accompanying figures are incorporated in, and constitute a part of this specification. All $NH_3$-SCR data were collected under the following conditions: 500 ppm NO; $NH_3/NO$=1.0; 5 vol % $O_2$; balance $N_2$; space velocity=50,000 $h^{-1}$.

DETAILED DESCRIPTION OF THE INVENTION

Definitions

Figure 1:
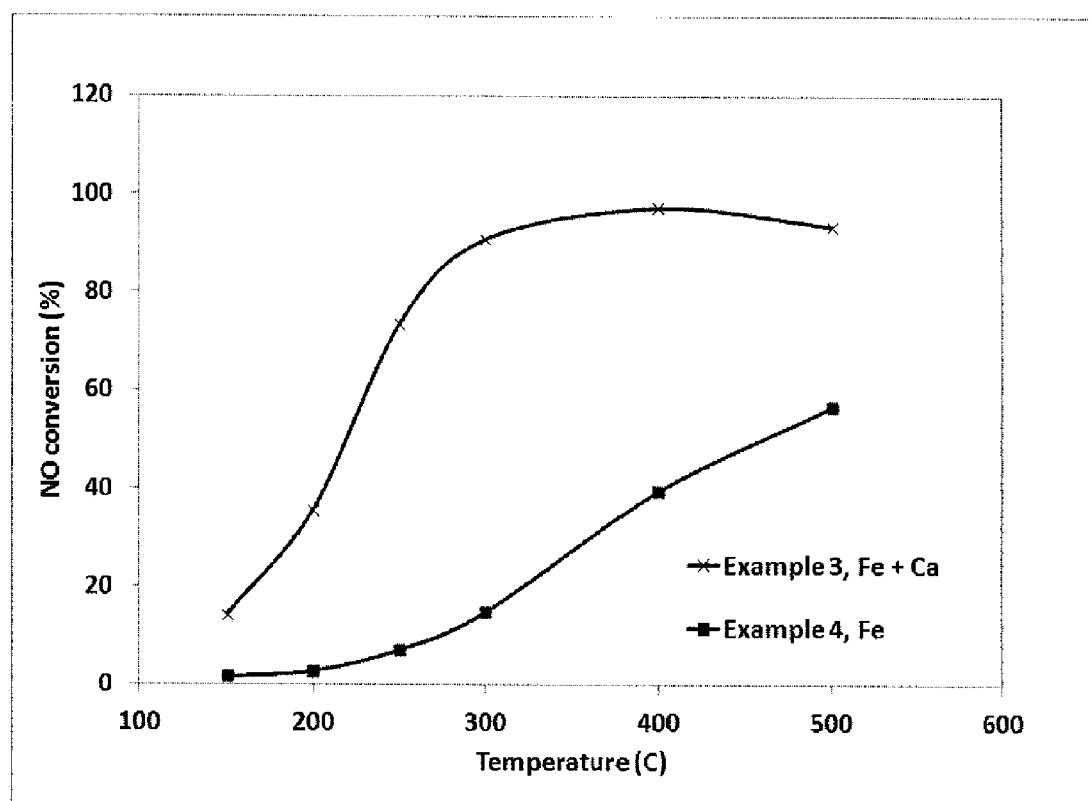
FIG. 1 compares SCR data over Fe-chabazite with and without Ca after steaming at 700° C. for 16 h in 10 percent water/air.

"Hydrothermally stable" means having the ability to retain a certain percentage of initial surface area and/or microporous volume after exposure to elevated temperature and/or humidity conditions (compared to room temperature) for a certain period of time. For example, in one embodiment, it is intended to mean retaining at least 70%, such as at least 80%, at least 90%, or even at least 95%, of its surface area and micropore volume after exposure to conditions simulating those present in an automobile exhaust, such as temperatures up to 900° C., including temperatures ranging from 700 to 900° C. in the presence of up to 10 volume percent (vol %) water vapor for times ranging from up to 1 hour, or even up to 16 hours, such as for a time ranging from 1 to 16 hours.

"Initial Surface Area" means the surface area of the freshly made crystalline material before exposing it to any aging conditions.

"Initial Micropore Volume" means the micropore volume of the freshly made crystalline material before exposing it to any aging conditions.

"Direct synthesis" (or any version thereof) refers to a method that does not require a metal-doping process after the zeolite has been formed, such as a subsequent ion-exchange or impregnation method.

"Defined by the Structure Commission of the International Zeolite Association," is intended to mean those structures included but not limited to, the structures described in "Atlas of Zeolite Framework Types," ed. Baerlocher et al., Sixth Revised Edition (Elsevier 2007), which is herein incorporated by reference in its entirety.

"Double-6-rings (d6r)" is a structural building unit described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with ammonia) in the presence of oxygen to form nitrogen and $H_2O$.

"Exhaust gas" refers to any waste gas formed in an industrial process or operation and by internal combustion engines, such as from any form of motor vehicle.

The phrases "chosen from" or "selected from" as used herein refers to selection of individual components or the combination of two (or more) components. For example, the metal portion of the large crystal, organic-free chabazite described herein may be chosen from copper and iron, which means the metal may comprise copper, or iron, or a combination of copper and iron.

There is disclosed a material that comprises a first metal chosen from alkali earth group, rare-earth group, alkali group or mixtures thereof, and a second metal chosen from iron, copper or mixtures thereof. Alkaline earth metals are the 6 elements that are located in Group 2 elements of the Periodic Table. Non-limiting examples of the alkaline earth metal that can comprise the first metal used herein include magnesium, calcium, strontium, or barium, or mixtures thereof. Alkali metals are the 6 elements that are located in Group 1 elements of the Periodic Table, excluding hydrogen. Non-limiting examples of the alkali metal that can comprise the first metal used herein include potassium, rubidium, cesium, or mixtures thereof.

In one embodiment, the material may comprise a crystal structure having building units of double-6-rings (d6r) and pore opening of 8-rings as exemplified with framework types defined by the Structure Commission of the International Zeolite Association having structural codes of CHA, LEV, AEI, AFT, AFX, EAB, ERI, KFI, SAT, TSC, and SAV (Ch. Baerlocher, L. B. McCusker and D. H. Olson, Atlas of Zeolite Framework Types, 6th revised edition, Elsevier, Amsterdam, 2007).

For example, the microporous crystalline material may comprise a microporous aluminosilicate zeolite, such as an aluminosilicate chabazite.

The material described herein typically has molar silica to alumina ratio (SAR) ranging from 3 to 10, such as from 5 to 7.

The material may be synthesized by a process free of organic structure directing agent (OSDA).

It is appreciated that the first metal, which includes, for example, magnesium, calcium, strontium, barium, lanthanum, cerium, praseodymium, neodymium, mixed rare earth oxides, potassium, rubidium, cesium or mixtures thereof, and second metals, e.g., copper or iron or mixtures thereof, can be introduced by liquid-phase or solid ion-exchange, impregnation or incorporated by direct-synthesis.

As one skilled in the art would appreciate, the first and second metals may be introduced into the material by liquid-phase or solid ion-exchange, impregnation or incorporated by direct-synthesis.

In one embodiment, the first metal comprises an amount of at least 0.2 weight percent of the total weight of the material, and in one embodiment, in an amount ranging from 0.2 to 5.0 weight percent. In one embodiment, the first metal comprises calcium in an amount ranging from 0.2 to 5.0 weight percent of the total weight of the crystalline material.

The atomic ratio of the first metal to aluminum may be between 0.05 and 0.80. In one embodiment, the first metal of the material is calcium, and the calcium to aluminum atomic ratio is between 0.05 and 0.50.

As described herein, the second metal, such as copper, may comprise an amount ranging from 0.5 to 10.0 weight percent of the total weight of the crystalline material. In one embodiment, the second metal of the material is copper, and the copper to aluminum atomic ratio is between 0.05 and 0.20.

The microporous crystalline material may also contain iron in an amount ranging from 0.5 to 10.0 weight percent of the total weight of the crystalline material. In one embodiment, the second metal of the material is iron, and the iron to aluminum atomic ratio is between 0.05 and 0.30.

The material typically comprises crystals having a mean size ranging from 0.3 to less than 10 microns, such as from 0.3 to 5.0 microns.

The material described herein exhibits excellent hydrothermal stability properties. For example, the disclosed material typically retains at least 70% of its surface area and micropore volume after exposure to temperatures of 700-800° C. in the presence of up to 10 volume percent water vapor for 1-16 hours.

The material disclosed herein may be synthesized by a method comprising:
mixing sources of sodium, potassium, alumina, silica, water and optionally a crystalline seed material to form a gel, wherein said gel has potassium to silica ($K/SiO_2$) molar ratio of less than 0.5 and hydroxide to silica ($OH/SiO_2$) molar ratio less than 0.35;
heating said gel in a vessel at a temperature ranging from 80° C. to 200° C. to form a crystalline product;
ammonium-exchanging said product; and
introducing first and second metals into said crystalline material by liquid-phase or solid ion-exchange, impregnation or incorporated by direct-synthesis.

In one embodiment, the alumina and silica sources disclosed comprise potassium-exchanged, proton-exchanged, ammonium-exchanged zeolite Y, potassium silicate or mixtures thereof.

There is also disclosed a method of selective catalytic reduction of nitrogen oxides in exhaust gas using the disclosed microcrystalline material. In one embodiment, the method comprises:
at least partially contacting the exhaust gases with an article comprising a microporous crystalline material having pore opening ranging from 3-5 Angstroms,
where the material comprises a first metal chosen from alkali earth group, rare-earth group, alkali group or mixtures thereof, and a second metal chosen from iron, copper or mixtures thereof.

In one embodiment, the contacting step may be performed in the presence of ammonia, urea or an ammonia generating compound.

In another embodiment, the contacting step may be performed in the presence of hydrocarbon compound.

As mentioned, the material used in the described method may comprise a crystal structure having building units of double-6-rings (d6r) and pore opening of 8-rings as exemplified with framework types defined by the Structure Commission of the International Zeolite Association having structural codes of CHA, LEV, AEI, AFT, AFX, EAB, ERI, KFI, SAT, TSC, and SAV.

In one embodiment, the material used in the disclosed method comprises a silicoaluminophosphate (SAPO) molecular sieve, such as SAPO-34 having CHA framework type. The crystalline SAPO molecular sieve used in the disclosed method may comprise $SiO_2$ in an amount ranging from 1 to 20 weight percent of the total weight of the crystalline material.

It is appreciated that the first metal, which includes, for example, magnesium, calcium, strontium, barium, lanthanum, cerium, praseodymium, neodymium, mixed rare earth oxides, potassium, rubidium, cesium or mixtures thereof, and second metals, e.g., copper, can be introduced by liquid-phase or solid ion-exchange, impregnation or incorporated by direct-synthesis.

In one embodiment, the first metal comprises an amount of at least 0.2 weight percent of the total weight of the crystalline material. When the first metal comprises calcium, it is typically used in an amount ranging from 0.2 to 5.0 weight percent of the total weight of the crystalline material.

When the second metal comprises copper, it is typically used in an amount ranging from 0.5 to 10.0 weight percent of the total weight of the crystalline material.

When the second metal comprises iron, it is also typically used in an amount ranging from 0.5 to 10.0 weight percent of the total weight of the crystalline material.

In one embodiment, the material used in the disclosed method comprises crystals in size ranging from 0.3 and 5 microns.

It is appreciated that the material described herein may be used in article, such as one in the form of a channeled or honeycombed-shaped body; a packed bed, such as balls, pebbles, pellets, tablets, extrudates, other particles, or combinations thereof; microspheres; or structural pieces, such as in the form of plates or tubes.

As one skilled in the art would appreciate, the channeled or honeycombed-shaped body or structural piece is formed by wash-coating said crystalline material onto a preformed honeycombed-shaped body or by extruding a mixture comprising the said crystalline material.

EXAMPLES

The invention will be further clarified by the following non-limiting examples, which are intended to be purely exemplary of the invention.

Example 1

Large Crystal Organic-Free Chabazite Synthesis

Deionized water, potassium hydroxide solution (45 wt % KOH) and potassium-exchanged zeolite Y powder were mixed together to form a gel with the following composition: 5.5 $SiO_2$: 1.0 $Al_2O_3$: 1.09 $K_2O$: 66 $H_2O$. This gel composition has an $OH/SiO_2$ ratio of 0.05. The gel was stirred at room temperature for about 30 min before adding 1.5 wt % of chabazite seeds and stirring for another 30 min. The gel was then charged to an autoclave. The autoclave was heated to 120° C. and maintained at the temperature for 60 hours while stirring at 300 rpm. After cooling, the product was recovered by filtration and washed with deionized water. The resulting product had the XRD pattern of chabazite, an SAR of 5.5 and contained 16.5 wt % $K_2O$. The product was exchanged with ammonium nitrate four times to reduce the potassium content to 0.27 wt % $K_2O$.

Example 2

Ca-Exchange of Ammonium Exchanged Chabazite

The sample from Example 1 was subsequently exchanged with calcium nitrate at 80° C. for 2 hours. Following the exchange, the material was filtered, washed with deionized water and then dried.

Example 3

Fe-Exchange of Ca-Chabazite

The calcium-exchanged chabazite sample from Example 2 was exchanged with ferrous sulfate at ambient temperature for 3 hours. After filtering, washing and drying the sample contained 2.5 wt % CaO and 5.2 wt % $Fe_2O_3$.

Comparative Example 4

Fe-Exchange of Ammonium-Exchanged Chabazite

The ammonium-exchanged chabazite sample from Example 1 was exchanged with ferrous sulfate at ambient temperature for 3 hours. After filtering, washing and drying the sample contained 3.2 wt % $Fe_2O_3$.

Example 5

Cu-Exchange of Ca-Chabazite

The calcium-exchanged chabazite sample from Example 2 was exchanged with copper nitrate at 60° C. for 2 hours. After filtering, washing and drying the sample contained 2.7 wt % CaO and 5.5 wt % CuO.

Comparative Example 6

Cu-Exchange of Ammonium-Exchanged Chabazite

The ammonium-exchanged chabazite sample from Example 1 was exchanged with copper nitrate at 60° C. for 2 hours. After filtering, washing and drying the sample contained 5.0 wt % CuO.

Example 7

Large Crystal Organic-Free Chabazite Synthesis

Deionized water, potassium hydroxide solution (45 wt % KOH) and potassium-exchanged zeolite Y powder were mixed together to form a gel with the following composition: 5.5 $SiO_2$: 1.0 $Al_2O_3$: 1.02 $K_2O$: 66 $H_2O$. This gel composition has an $OH/SiO_2$ ratio of 0.025. The gel was stirred at room temperature for about 30 min before adding 0.5 wt % of chabazite seeds and stirring for another 30 min. The gel was then charged to an autoclave. The autoclave was heated to 140° C. and maintained at the temperature for 36 hours while stirring at 300 rpm. After cooling, the product was recovered by filtration and washed with deionized water. The resulting product had the XRD pattern of chabazite, an SAR of 5.6 and contained 16.7 wt % $K_2O$. The product was exchanged with ammonium nitrate twice to reduce the potassium content to 2.0 wt % $K_2O$.

Example 8

Ca-Exchange of Ammonium Exchanged Chabazite

The sample from Example 7 was subsequently exchanged with calcium nitrate at 80° C. for 2 hours. Following the exchange, the material was filtered, washed with deionized water and then dried.

Example 9

Cu-Exchange of Ca-Chabazite

The calcium-exchanged chabazite sample from Example 8 was exchanged with copper nitrate at 60° C. for 2 hours. After filtering, washing and drying the sample contained 2.9 wt % CaO and 5.4 wt % CuO.

Example 10

Cu-Exchange of Ca-Chabazite

The calcium-exchanged chabazite sample from Example 8 was exchanged with copper nitrate at 60° C. for 2 hours. After filtering, washing and drying the sample contained 3.1 wt % CaO and 3.2 wt % CuO.

Example 11

Incipient Wetness Impregnation of Copper Acetate on Calcium Exchanged Chabazite The calcium-exchanged chabazite sample from Example 8 was impregnated with copper acetate at ambient temperature. Following the impregnation, the material was calcined at 550° C. for 2 h. The sample contained 4.2 wt % CaO and 2.1 wt % CuO.

Example 12

Sr-Exchange of Ammonium Exchanged Chabazite

The sample from Example 1 was subsequently exchanged with strontium acetate at 80° C. for 2 hours. Following the exchange, the material was filtered, washed with deionized water and then dried.

Example 13

Cu-Exchange of Sr-Chabazite

The strontium-exchanged chabazite sample from Example 12 was exchanged with copper nitrate at 60° C. for 2 hours. After filtering, washing and drying the sample contained 8.9 wt % SrO and 5.0 wt % CuO.

Example 14

Incipient Wetness Impregnation of Lanthanum Nitrate on Ammonium Exchanged Chabazite The sample from Example 7 was impregnated with a lanthanum nitrate solution at ambient temperature. Following the impregnation, the material was calcined at 550° C. for 2 h.

Example 15

Cu-Exchange of La-Chabazite

The lanthanum-chabazite sample from Example 14 was exchanged with copper nitrate at 60° C. for 2 hours. After filtering, washing and drying the sample contained 8.7 wt % $La_2O_3$ and 3.0 wt % CuO.

Sample Performance Evaluation

Samples from Examples 3-6 and 9-15 were steamed at 700, 750 and/or 800° C. in the presence of 10 vol % water vapor for 16 hours to simulate automotive exhaust aging conditions.

The surface area of the materials before and after aging was measured using nitrogen gas adsorption following the BET method. A Quantachrome Autosorb unit was used for these measurements, and the data was collected between relative pressures (P/P0) of 0.01 and 0.05 at liquid nitrogen temperatures.

The nitrogen adsorption data collected at the same time as the surface area measurement were also used to calculate the micropore volume of the materials using the t-plot method.

The activities of the hydrothermally aged materials for $NO_x$ conversion, using $NH_3$ as reductant, were tested with a flow-through type reactor. Powder zeolite samples were pressed and sieved to 35/70 mesh and loaded into a quartz tube reactor. The gas composition for $NH_3$-SCR was 500 ppm NO, 500 ppm $NH_3$, 5 vol % $O_2$, $0.6\%$ $H_2O$ and balance $N_2$. The space velocity was 50,000 $h^{-1}$. Reactor temperature was ramped and NO conversion was determined with an MKS MultiGas 2030 infrared analyzer at each temperature interval.

Table 1 compares the surface area retention and NO conversion during $NH_3$-SCR on Fe-chabazite with and without Ca after steaming at 700° C. for 16 hours in 10 percent water/air.

TABLE 1

| Example | | Ex. 3 | Comp. Ex. 4 |
|---|---|---|---|
| $Fe_2O_3$ | wt % | 5.2 | 3.2 |
| CaO | wt % | 2.5 | 0 |
| Fe/Al atomic ratio | | 0.15 | 0.09 |
| Ca/Al atomic ratio | | 0.10 | 0.00 |
| Initial surface area | $m^2/g$ | 640 | 677 |
| Surface area after steaming at 700° C. | $m^2/g$ | 564 | 328 |
| Surface area retention | % | 88 | 49 |
| Initial micropore volume | cc/g | 0.24 | 0.26 |
| Micropore volume after steaming at 700° C. | cc/g | 0.21 | 0.11 |
| NO conversion at 300° C. | % | 90.7 | 14.9 |
| NO conversion at 500° C. | % | 93.4 | 56.6 |

Table 1 shows that the surface area retention of the Ca—Fe chabazite exceeds that of the comparable material without Ca. Surface area and micropore volume retention of materials of the current invention should be at least 70%, and preferably at least 80% after this deactivation simulation exposure.

With reference to the SCR data shown in FIG. 1, it is clear that NOx conversion for an Fe-chabazite further containing Ca far exceeds that of an Fe-chabazite not containing Ca, when tested on a sample subjected to steaming at 700° C. for 16 hours in 10 percent water/air.

Table 2 compares the surface area retention and NO conversion during $NH_3$-SCR on Cu-chabazite with and without Ca after steaming at 700° C. for 16 hours in 10 percent water/air.

TABLE 2

| Example | | Ex. 5 | Comp. Ex. 6 |
|---|---|---|---|
| CuO | wt % | 5.5 | 5.0 |
| CaO | wt % | 2.7 | 0.0 |
| Cu/Al atomic ratio | | 0.16 | 0.15 |
| Ca/Al atomic ratio | | 0.11 | 0.00 |
| Initial surface area | m$^2$/g | 642 | 638 |
| Surface area after steaming at 700° C. | m$^2$/g | 583 | 512 |
| Surface area retention | % | 91 | 80 |
| Initial micropore volume | cc/g | 0.25 | 0.24 |
| Micropore volume after steaming at 700° C. | cc/g | 0.22 | 0.18 |
| NO conversion at 175° C. | % | 99.7 | 86.1 |
| NO conversion at 450° C. | % | 92.2 | 87.9 |

Table 3 compares the surface area retention and NO$_x$ conversion during NH$_3$-SCR on Cu-chabazite with and without Ca, Sr or La after steaming at 750° C. for 16 hours in 10 percent water/air.

TABLE 3

| | | Example | | | |
|---|---|---|---|---|---|
| | | Comp. Ex. 6 | Ex. 9 | Ex. 13 | Ex. 15 |
| CuO | wt % | 5.0 | 5.4 | 5.0 | 3.0 |
| CaO | wt % | 0.0 | 2.9 | 0.0 | 0.0 |
| SrO | wt % | 0.0 | 0.0 | 7.9 | 0.0 |
| La$_2$O$_3$ | Wt % | 0.0 | 0.0 | 0.0 | 8.7 |
| Cu/Al atomic ratio | | 0.15 | 0.16 | 0.14 | 0.09 |
| Ca/Al, Sr/Al, La/Al ratio | | 0.00 | 0.12 | 0.17 | 0.15 |
| Initial surface area | m$^2$/g | 638 | 641 | 648 | 527 |
| Surface area after steaming at 750° C. | m$^2$/g | <10 | 584 | 560 | 423 |
| Surface area retention | % | <2 | 91 | 86 | 81 |
| Initial micropore volume | cc/g | 0.24 | 0.24 | 0.25 | 0.20 |
| Micropore volume after steaming at 750° C. | cc/g | <0.01 | 0.22 | 0.21 | 0.15 |
| NO conversion at 175 ° C. | % | 0.1 | 99.7 | 98.3 | 81.0 |
| NO conversion at 450 ° C. | % | 7.4 | 91.9 | 91.0 | 90.2 |

Table 4 compares the surface area retention and NO conversion during NH$_3$-SCR on Cu-chabazite with and without Ca after steaming at 800° C. for 16 hours in 10 percent water/air.

TABLE 4

| Example | | Comp. Ex. 6 | Ex. 10 | Ex. 11 |
|---|---|---|---|---|
| CuO | wt % | 5.0 | 3.2 | 2.0 |
| CaO | wt % | 0.0 | 3.1 | 4.2 |
| Cu/Al atomic ratio | | 0.15 | 0.10 | 0.06 |
| Ca/Al atomic ratio | | 0.00 | 0.13 | 0.17 |
| Initial surface area | m$^2$/g | 638 | 589 | 527 |
| Surface area after steaming at 800° C. | m$^2$/g | <10 | 459 | 354 |
| Surface area retention | % | <2 | 78 | 67 |
| Initial micropore volume | cc/g | 0.24 | 0.22 | 0.20 |
| Micropore volume after steaming at 800° C. | cc/g | <0.01 | 0.17 | 0.13 |
| NO conversion at 175 ° C. | % | | 92.8 | 75.3 |
| NO conversion at 450 ° C. | % | | 87.2 | 87.9 |

Tables 2-4 show that the surface area retention of the Ca—Cu chabazite exceeds the comparable material without Ca. Surface area and micropore volume retention of materials of the current invention should be at least 70%, and preferably at least 80% after these deactivation simulation exposures, for example at 700-800° C. for 16 hours in 10 percent water/air.

Figure 2:
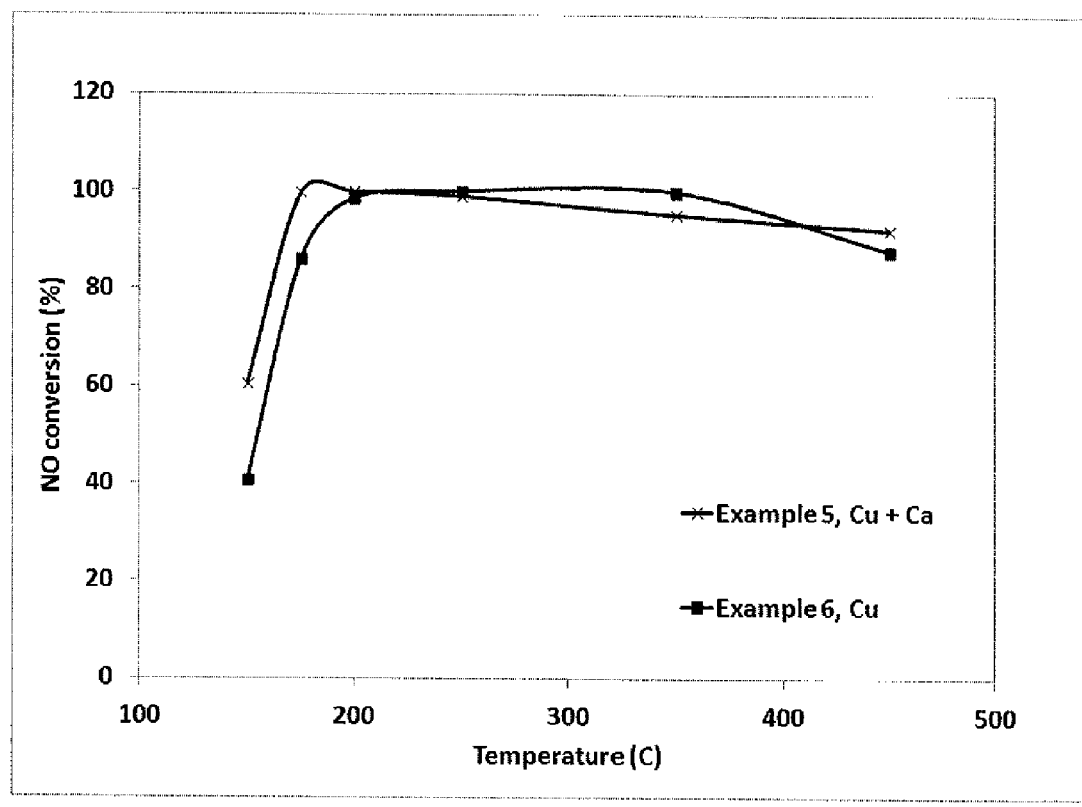
FIG. 2 compares SCR data over Cu-chabazite with and without Ca after steaming at 700° C. for 16 h in 10 percent water/air.

FIG. 2 compares SCR data over Cu-chabazite with and without Ca after steaming at 700° C. for 16 h in 10 percent water/air. The data in FIG. 2 shows improved NOx activity over a temperature ranging from 200 to above 400° C.

Example 16

Synthesis of SAPO-34

Pseudoboehmite alumina, phosphoric acid, ammonium-stabilized silica sol (Nyacol 2040NH4), tetraethylammonium hydroxide (TEAOH) solution, morpholine, and deionized water were mixed together to form a gel with the following molar composition:

0.6 SiO$_2$: 1.0 Al$_2$O$_3$: 1.0 P$_2$O$_5$: 0.85 Morpholine: 0.4 TEAOH: 32.5 H$_2$O The gel was stirred at room temperature for about 30 min and SAPO-34 seeds in the amount of about 1% of total inorganic solids of the gel were added before charged to an autoclave. The autoclave was heated to 180° C. and maintained at the temperature for 24 hours. After cooling, the product was recovered by filtration and washed with deionized water. The product was then dried and calcined to remove organic. The SAPO-34 product contained about 12% SiO$_2$.

Comparable Example 17

Cu-Exchange of SAPO-34

The SAPO-34 sample from Example 16 was exchanged with copper nitrate at 60° C. for 3 hours. After filtering, washing and drying the sample contained 3.0 wt % CuO.

Example 18

Ca-Exchange of SAPO-34

The SAPO-34 sample from Example 16 was exchanged with calcium hydroxide at ambient temperature for 2 hours. After filtering, washing and drying the sample contained 0.9 wt % CaO.

Example 19

Cu-Exchange of Ca-SAPO-34

The Ca-SAPO-34 sample from Example 18 was exchanged with copper nitrate at ambient temperature for 4 hours. After filtering, washing and drying the sample contained 1.9 wt % CuO and 0.8 wt % CaO.

Example 20

K-Exchange of SAPO-34

The SAPO-34 sample from Example 16 was exchanged with potassium nitrate at 80° C. for 2 hours. After filtering, washing and drying the sample contained 1.5 wt % K$_2$O.

Example 21

Cu-Exchange of K-SAPO-34

The K-SAPO-34 sample from Example 20 was exchanged with copper nitrate at ambient temperature for 4 hours. After filtering, washing and drying the sample contained 3.0 wt % CuO and 1.5 wt % $K_2O$.

Example 22

Direct Synthesis of Ca-SAPO-34

Pseudoboehmite alumina, phosphoric acid, ammonium-stabilized silica sol (Nyacol 2040NH4), calcium acetate, tetraethylammonium hydroxide (TEAOH) solution, morpholine, and deionized water were mixed together to form a gel with the following molar composition:

0.5 $SiO_2$: 1.0 $Al_2O_3$: 1.0 $P_2O_5$: 0.1 CaO: 0.85 Morpholine: 0.4 TEAOH: 31.5 $H_2O$ The gel was stirred at room temperature for about 30 min and SAPO-34 seeds in the amount of about 1% of total inorganic solids of the gel were added before charged to an autoclave. The autoclave was heated to 180° C. and maintained at the temperature for 24 hours. After cooling, the product was recovered by filtration and washed with deionized water. The product was then dried and calcined to remove organic. The Ca-SAPO-34 product contained about 11% $SiO_2$ and 1.7% CaO.

Example 23

Cu-Exchange of Direct-Synthesized Ca-SAPO-34

The Ca-SAPO-34 sample from Example 22 was exchanged with copper nitrate at 60° C. for 3 hours. After filtering, washing and drying, the sample contained 3.0 wt % CuO.

Example 24

Ca- and Cu-Exchange of SAPO-34

The Ca-SAPO-34 sample from Example 16 was exchanged with calcium hydroxide and copper nitrate at 40° C. for 3 hours. After filtering, washing and drying, the sample contained 3.5 wt % CuO and 0.60 wt % CaO.

Hot Water Stability Test

Water stability tests were done by slurrying 4 g of material in 12 g of water. The slurry was put in a 23 mL Parr bomb and the Parr bomb was placed in an oven at 105° C. for 24 h. Subsequently, the slurry was filtered, washed and dried. The surface area was analyzed before and after the water treatment.

Steam Stability Test

The samples were also steamed at 900° C. in the presence of 10 vol % water vapor for 1 hour to simulate automotive exhaust aging conditions. The activities of the hydrothermally aged materials for NO conversion, using $NH_3$ as reductant, were tested with a flow-through type reactor. Powder zeolite samples were pressed and sieved to 35/70 mesh and loaded into a quartz tube reactor. Reactor temperature was ramped and NO conversion was determined with an infrared analyzer at each temperature interval.

Table 5 compares the surface area retention of various SAPO-34 samples after water treatment at 105° C. for 24 hours.

TABLE 5

| | | Example | | | | | | |
|---|---|---|---|---|---|---|---|---|
| | | Ex. 16 | Comp. Ex. 17 | Ex. 18 | Ex. 19 | Ex. 20 | Ex. 21 | Ex. 23 | Ex. 24 |
| Initial surface area | $m^2/g$ | 754 | 702 | 739 | 654 | 704 | 634 | 634 | 693 |
| Surface area after water treatment | $m^2/g$ | 6 | 29 | 485 | 515 | 588 | 501 | 448 | 672 |
| Surface area retention | % | 0.8 | 4 | 66 | 79 | 83 | 79 | 71 | 97 |
| Initial micropore volume | cc/g | 0.29 | 0.27 | 0.29 | 0.25 | 0.27 | 0.24 | 0.24 | 0.27 |
| Micropore volume after water treatment | cc/g | 0.003 | 0.01 | 0.18 | 0.20 | 0.22 | 0.19 | 0.17 | 0.26 |

Table 5 shows that the addition of Ca or K to SAPO-34, as in Examples 18, 19, 20, 21, 23 and 24, stabilizes the material to the hot water treatment, whereas the materials without Ca or K (SAPO-34 from Example 16 and Cu-SAPO-34 from Comparative Example 17) are essentially completely destroyed by the treatment. It is desirable that the SAPO-34 materials of the current invention retain at least 40% and preferably at least 60% of their surface area and micropore volume after being subjected to the hot water treatment.

Table 6 compares the NO conversion during $NH_3$-SCR of Examples 17, 23 and 24 after steaming at 900° C. for 1 hour in 10 percent water/air.

TABLE 6

| Example | | Comp. Ex. 17 | Ex. 23 | Ex. 24 |
|---|---|---|---|---|
| NO conversion at 175° C. | % | 81.7 | 97.6 | 96.1 |
| NO conversion at 450° C. | % | 77.0 | 82.0 | 77.5 |

Table 6 shows that inventive Examples 23 and 24 containing Ca are more active, especially at low temperatures such as 175° C., than Comparative Example 17 without Ca for $NH_3$-SCR after steaming at 900° C. for 1 hour.

Figure 3:
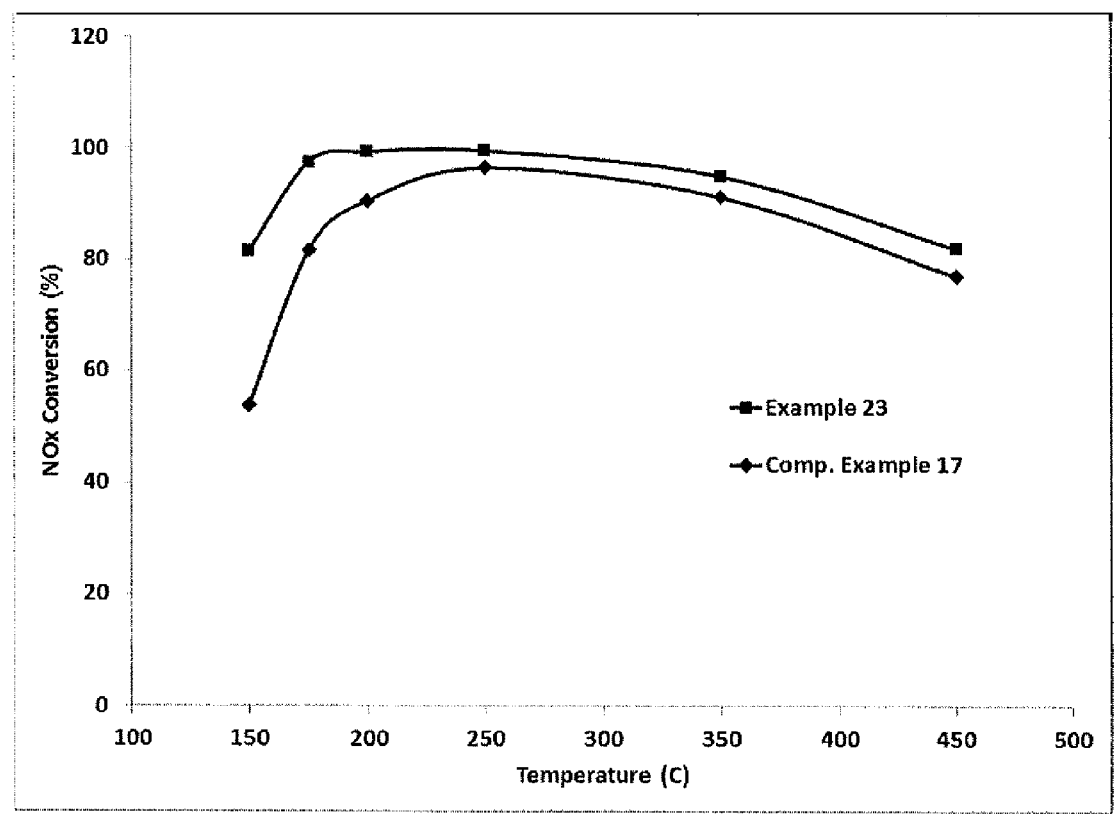
FIG. 3 compares SCR data for Cu-SAPO-34 with and without Ca after steaming at 900° C. for 1 h in 10 percent water/air.

FIG. 3 compares SCR data for Comparative Example 17 with inventive Example 23 after steaming at 900° C. for 1 h in 10 percent water/air. The data show that SAPO-34 samples containing two metals (here calcium), exhibits improved NOx conversion efficiency compared to a sample not containing Ca.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A microporous crystalline material having a pore opening ranging from 3 to 5 Angstroms synthesized by a process free of organic structure directing agent (OSDA), where said material has molar silica to alumina ratio (SAR) ranging from 3 to 10 and comprises a first metal chosen from an alkali-earth group, a rare-earth metal chosen from lanthanum, praseodymium, neodymium and oxides thereof and mixtures thereof, an alkali group or mixtures thereof, and a second metal chosen from copper, iron or mixtures thereof, wherein the first metal to aluminum atomic ratio ranges from 0.05 to 0.80.

2. The microporous crystalline material of claim 1, where said material comprises a crystal structure having building units of double-6-rings (d6r) and pore opening of 8-rings.

3. The microporous crystalline material of claim 1, wherein said material comprises CHA structure.

4. The microporous crystalline material of claim 2, wherein said crystal structure comprises structural codes of LEV, AEI, AFT, AFX, EAB, ERI, KFI, SAT, TSC, and SAV.

5. The microporous crystalline material of claim 1, where said first metal comprises magnesium, calcium, strontium, barium, lanthanum, praseodymium, neodymium, oxides of lanthanum, neodymium or praseodymium, potassium, rubidium, cesium or mixtures thereof.

6. The microporous crystalline material of claim 1, where said first and second metals are introduced into said material by liquid-phase or solid ion-exchange, impregnation or incorporated by direct-synthesis.

7. The microporous crystalline material of claim 1, where said material comprises calcium with calcium to aluminum atomic ratio between 0.05 and 0.50.

8. The microporous crystalline material of claim 1, where said material comprises copper with copper to aluminum atomic ratio between 0.05 and 0.20.

9. The microporous crystalline material of claim 1, where said material comprises iron with iron to aluminum atomic ratio between 0.05 and 0.30.

10. The microporous crystalline material of claim 1, where said material comprises a mean crystal size ranging from 0.3 to 5 microns.

11. The microporous crystalline material of claim 1, where said material retains at least 70% of its surface area and micropore volume after exposure to temperatures of 700-800° C. in the presence of up to 10% volume percent water vapor for 1-16 hours.

12. A method of selective catalytic reduction of nitrogen oxides in exhaust gas, said method comprising:
at least partially contacting said exhaust gases with an article comprising a microporous crystalline material having a pore opening ranging from 3 to 5 Angstroms synthesized by a process free of organic structure directing agent (OSDA), where said material has molar silica to alumina ratio (SAR) ranging from 3 to 10 and comprises a first metal chosen from an alkali-earth group, a rare-earth metal chosen from lanthanum, praseodymium, neodymium and oxides thereof and mixtures thereof, an alkali group or mixtures thereof, and a second metal chosen from copper, iron or mixtures thereof, wherein first metal to aluminum atomic ratio is between 0.05 and 0.80.

13. The method of claim 12, where said contacting step is performed in the presence of ammonia, urea, an ammonia generating compound, or a hydrocarbon compound.

14. The method of claim 12, where said material comprises a crystal structure having building units of double-6-rings (d6r) and pore opening of 8-rings.

15. The method of claim 12, wherein said material comprises CHA structure.

16. The method of claim 14, wherein said crystal structure comprises structural codes of LEV, AEI, AFT, AFX, EAB, ERI, KFI, SAT, TSC, and SAV.

17. The method of claim 12, where said first metal comprises magnesium, calcium, strontium, barium, lanthanum, praseodymium, neodymium, oxides of lanthanum, neodymium or praseodymium, potassium, rubidium, cesium, or mixtures thereof.

18. The method of claim 12, where said first and second metals are introduced into said material by liquid-phase or solid ion-exchange, impregnation or incorporated by direct-synthesis.

19. The method of claim 12, where said material comprises calcium with calcium to aluminum atomic ratio between 0.05 and 0.50.

20. The method of claim 12, where said material comprises copper with copper to aluminum atomic ratio between 0.05 and 0.20.

21. The method of claim 12, where said material comprises iron with iron to aluminum atomic ratio between 0.05 and 0.30.

22. The method of claim 12, where said material comprises a mean crystal size ranging from 0.3 to 5 microns.

23. The method of claim 12, where said material retains at least 70% of its surface area and micropore volume after exposure to temperatures of 700-800° C. in the presence of up to 10% volume percent water vapor for 1-16 hours.

24. A method of making microporous crystalline material having a pore opening ranging from 3 to 5 Angstroms synthesized by a process free of organic structure directing agent (OSDA), where said material has molar silica to alumina ratio (SAR) ranging from 3 to 10 and comprises a first metal chosen from an alkali-earth group, a rare-earth metal chosen from lanthanum, praseodymium, neodymium and oxides thereof and mixtures thereof, an alkali group or mixtures thereof, and a second metal chosen from copper, iron or mixtures thereof, wherein first metal to aluminum atomic ratio is between 0.05 and 0.80, said method comprising:
mixing sources of sodium, potassium, alumina, silica, water and optionally a crystalline seed material to form a gel, wherein said gel has potassium to silica (K/SiO2) molar ratio of less than 0.5 and hydroxide to silica (OH/SiO2) molar ratio less than 0.35;
heating said gel in a vessel at a temperature ranging from 80° C. to 200° C. to form a crystalline product;
ammonium-exchanging said product; and
introducing first and second metals into said crystalline material by liquid-phase or solid ion-exchange, impregnation or incorporated by direct-synthesis.

25. The method of claim 24, wherein said alumina and silica sources comprise potassium-exchanged, proton-exchanged, ammonium-exchanged zeolite Y, potassium silicate or mixtures thereof.

26. The method of claim 24, where said material comprises a crystal structure having building units of double-6-rings (d6r) and pore opening of 8-rings.

27. The method of claim 24, wherein said material comprises CHA structure.

28. The method of claim 26, wherein said crystal structure comprises structural codes of LEV, AEI, AFT, AFX, EAB, ERI, KFI, SAT, TSC, and SAV.

29. The method of claim 24, where said first metal comprises magnesium, calcium, strontium, barium, lanthanum, praseodymium, neodymium, oxides of lanthanum, neodymium or prasedymium, potassium, rubidium, cesium, or mixtures thereof.

30. The method of claim 24, where said first and second metals are introduced into said material by liquid-phase or solid ion-exchange, impregnation or incorporated by direct-synthesis.

31. The method of claim 24, where said material comprises calcium with calcium to aluminum atomic ratio between 0.05 and 0.50.

32. The method of claim 24, where said material comprises copper with copper to aluminum atomic ratio between 0.05 and 0.20.

33. The method of claim 24, where said material comprises iron with iron to aluminum atomic ratio between 0.05 and 0.30.

34. The method of claim 24, where said material comprises a mean crystal size ranging from 0.3 to 5 microns.

35. The method of claim 24, where said material retains at least 70% of its surface area and micropore volume after exposure to temperatures of 700-800° C. in the presence of up to 10% volume percent water vapor for 1-16 hours.

\* \* \* \* \*